Aug. 19, 1952 V. S. SANG 2,607,906
AUTOMATIC GLARE SHIELD CONTROL
Filed Dec. 6, 1948 2 SHEETS—SHEET 1
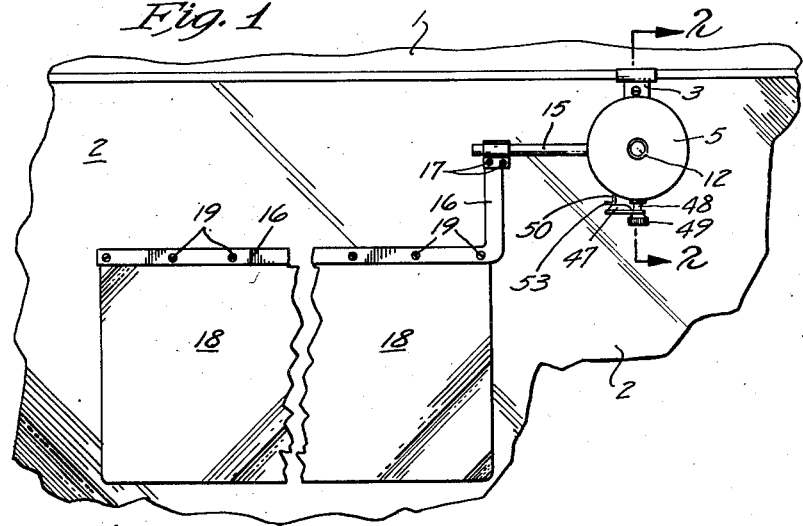
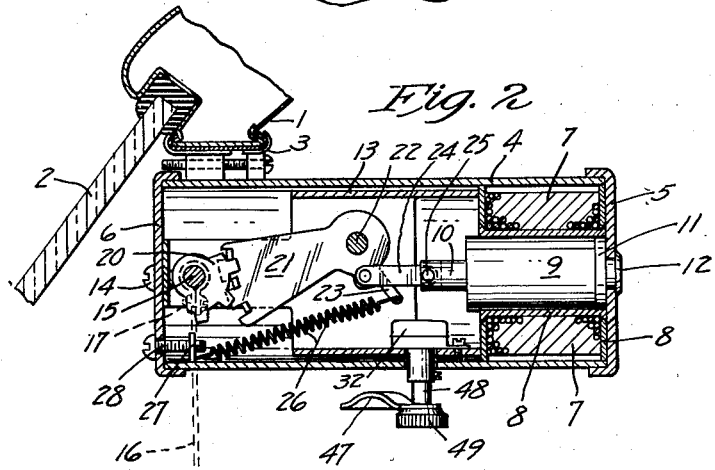
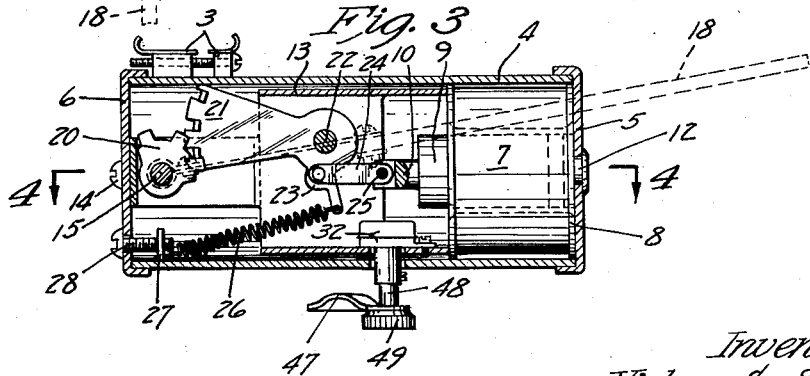
Inventor
Victor S. Sang
By his Attorneys
Merchant & Merchant Aug. 19, 1952  V. S. SANG  2,607,906
AUTOMATIC GLARE SHIELD CONTROL
Filed Dec. 6, 1948  2 SHEETS—SHEET 2
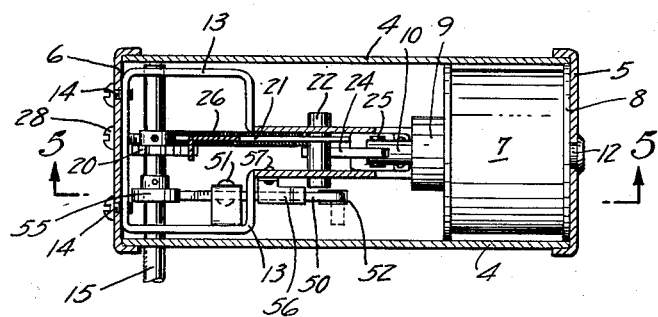
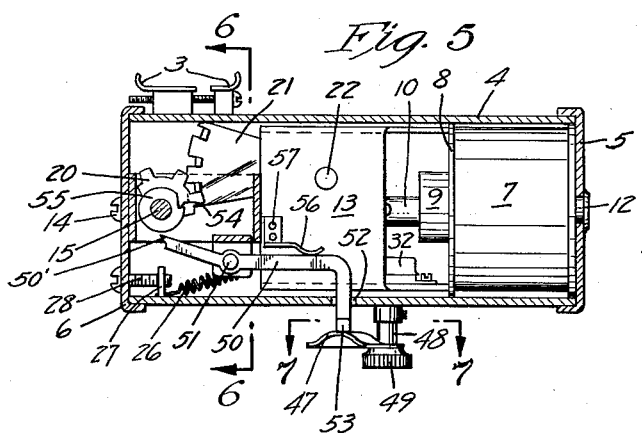
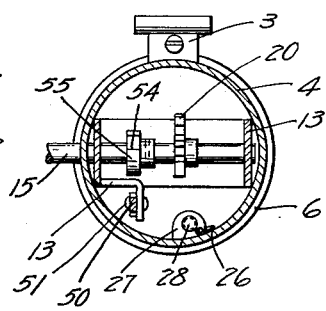
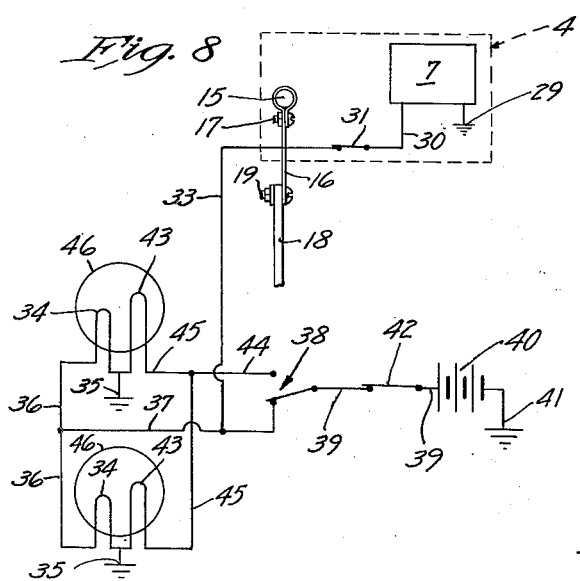
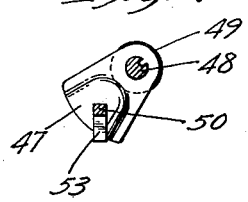
Inventor
Victor S. Sang
By his Attorneys
Merchant & Merchant Patented Aug. 19, 1952

2,607,906

UNITED STATES PATENT OFFICE 2,607,906

AUTOMATIC GLARE SHIELD CONTROL

Victor S. Sang, Minneapolis, Minn.

Application December 6, 1948, Serial No. 63,743

4 Claims. (Cl. 315—82)

My invention relates to improvements in anti-glare shields in automotive vehicles and the like and, more particularly, to that type of glare shield which automatically moves into an operative position when the low beam filaments of the headlights thereof are put into operation for the purpose of meeting oncoming vehicles and the like, and which are returned to normal inoperative position out of the field of vision of the operator after the approaching vehicle has passed and the high beams of the lights are again put into operation.

The primary object of my invention is the provision of means whereby such automatic-controlled glare shields may be manually placed or retained in operative position, either when said light circuits are on or off.

A still further and highly important object of my invention is the provision of means, whereby the electric motor for moving the glare shield to and from operative positions is automatically rendered inoperative when the glare shield is manually locked in operative position.

Another important object of my invention is the provision of such a device which is relatively simple and inexpensive to construct, easy to install, and relatively troublefree in use.

The above and still further objects of my invention will become apparent from the following detailed specification, appended claims, and attached drawings.

Referring to the drawings, wherein like characters indicate like parts throughout the several views:

Fig. 1 is a rear view of my device installed on a vehicle and showing the anti-glare shield in its operative position;

Fig. 2 is an enlarged vertical section, taken on the line 2—2 of Fig. 1;

Fig. 3 is a view corresponding to Fig. 2 but showing a different position of some of the parts;

Fig. 4 is a horizontal section, taken substantially on the line 4—4 of Fig. 3;

Fig. 5 is a view partly in side elevation and partly in section, taken substantially on the line 5—5 of Fig. 4;

Fig. 6 is a transverse section, taken substantially on the line 6—6 of Fig. 5;

Fig. 7 is a fragmentary detail, partly in plan and partly in section, taken on the line 7—7 of Fig. 5; and Fig. 8 is an electrical wiring diagram of the lighting system of a headlight-equipped vehicle in which my novel device is interposed.

Referring with greater particularity to the drawings, the numeral 1 indicates a windshield frame of an automotive vehicle in which is mounted a conventional windshield 2. Secured to the frame 1 by any suitable means, such as a screw clamp 3, is an elongated tubular frame member or housing 4, the opposite ends of which are closed by cup-like end plates 5 and 6.

Within the tubular frame member 4 and adjacent the cap 5 is an annular solenoid coil 7 mounted on a metal spool 8. Mounted for reciprocating movements within the annular solenoid coil 7 is a metallic plunger 9 having a reduced neck 10. Plunger 9 is adapted to stop against an electromagnetic core 11 which is riveted to the end plate 5, as indicated at 12. The solenoid coil 7 is held fast against the end plate 5 by a bracket 13 which extends therebetween and the end cap or plate 6 and is secured to the end plate 6 by means of screws or the like 14. Clearly the elements 7, 8 and 9 comprise a reciprocating type of electric motor.

Journalled in the bracket 13 and extending laterally outwardly of the frame or housing 4 is a shaft 15, to the outer end portion of which is clamped an L-shaped arm 16. As shown, the upper end of the arm 16 is bent around the shaft 15 and clamped thereto by means of screws or the like 17. Loosening of the screws 17 will permit axial movement of the arm 16 on the shaft 15 for a purpose which will hereinafter become apparent. An anti-glare shield 18, preferably rectangular in form, is rigidly secured by means of nut-equipped bolts or the like 19, to the arm 16 and may be made from a colored transparent material such as Celluloid or the like. As illustrated in Figs. 1 and 8 and by broken lines in Fig. 2, the anti-glare shield 18, in its operative position, is located in the field of vision of the vehicle operator. Partial rotation of the shaft 15 in a counterclockwise direction with respect to Figs. 2 and 3 will move the anti-glare shield 18 to an inoperative position out of the field of vision of the vehicle operator, as indicated by broken lines in Fig. 3. Rotation of shaft 15 is accomplished by mechanism now to be described.

A segmental gear 20 is secured fast to the shaft 15 within the frame 4 and has meshing engagement with a relatively large segmental gear 21 fast on a shaft 22 journalled in the bracket 13 in spaced parallel relationship to the shaft 15. Gear segment 21 is provided with a radially-projecting arm 23, to the intermediate portion of which is pivotally secured one end of a rigid link 24, the other end of which is pivotally secured to the bi-furcated end of the neck 10 of plunger 9 as at 25. A coil tension spring 26 has one end connected to the extreme outer end of arm 23 and its other end secured to a nut-acting plate 27. Plate 27 is screw-threaded to receive a screw 28 projecting inwardly through the end plate 6 and is held against rotation by engagement of one side edge thereof with the frame or housing 4 (see particularly Figs. 2, 3, 5, and 6). Tension of the spring 26 is varied by manipulation of the adjusting screw 28 and is sufficient to impart limited rotary movement to the shaft 15 through gear segments 20 and 21 to raise the anti-glare shield 18 from the position of Fig. 2 to that of Fig. 3 when solenoid 7 is de-energized. On the other hand, when solenoid 7 is energized, plunger 9 moves toward contact with core 11 overcoming bias of the spring 26 and rotating shaft 15 in a clockwise direction with respect to Figs. 2 and 3, whereby to bring the anti-glare shield 18 into its operative position in the field of vision of the vehicle operator.

Referring to Fig. 8, it will be seen that one end of solenoid coil 7 is grounded as indicated at 29. Preferably, this grounding is effected through the frame 4 and the windshield frame 1 of the body of the vehicle. A lead 30 connects solenoid coil 7 with a manually-operated switch 31, shown as being contained within a switch housing 32 in the frame 1. A single lead 33 connects switch 31 with the low beam headlight circuit of the vehicle which comprises low beam filaments 34 grounded at 35, leads 36 and 37 connecting filaments 34 to a high-low beam switch 38, a lead 39, and a battery 40 grounded as indicated at 41. A conventional off-on switch 42 is interposed in the lead 39 and is usually located on the instrument panel of the vehicle. The switch 38 is adapted to connect high beam filaments 43 to the battery 40 through lead 39 and leads 44 and 45. Filaments 34 and 43 are contained in conventional headlight bulbs 46.

During travel of the vehicle on a highway with the headlights 46 in operation through the high beam circuit, no electrical current will be supplied to the solenoid coils 7. Under these circumstances, anti-glare shield 18 will be held in its inoperative position of Fig. 3 by the spring 26. However, when the vehicle approaches another vehicle, the operator moves the switch 38 to open the circuit to the high beam filaments 43 and close the circuit to the low beam filaments 34. Closing of this circuit energizes solenoid coil 7 through leads 30 and 33 and closed switch 31. Energization of the solenoids causes the plunger 9 to move inwardly toward the core 11, thus rotating shaft 15 in a direction to swing the antiglare shield 18 into its operative position of Figs. 1, 2, and 8 against bias of the spring 26.

At times, the operator of the vehicle may be desirous of maintaining the anti-glare shield 18 in its lowered operative position when driving with high beam illumination. Therefore, I provide manually-operated means for locking the glare shield 18 in its lowered operative position as follows: A cam 47 is mounted for common rotation on a shaft 48 coupled to the switch 31 and closely adjacent a turning knob 49. A lever 50 is pivoted intermediate its ends to the bracket 13 as indicated at 51, has one end thereof projecting laterally outwardly through an opening 52 in the frame 4, and terminates in a foot 53 which is adapted to be engaged by cam 47. The opposite end 50' of lever 50 underlies the shaft 15 and is adapted to engage a radially-projecting shoulder or abutment 54 on a collar 55 secured fast to the shaft 15. A leaf spring 56 has one end secured fast to the bracket 13 as at 57, the free end thereof exerting yielding bias on the lever 50 toward engagement with the cam 47 and the abutment 54 on the collar 55. Cam 47 is so positioned on the shaft 48 with respect to the switch 31 that, when cam 47 engages the foot 53 of lever 50, switch 31 will be closed. When it is desired to lock shield 18 in its operative position in the field of vision of the operator, knob 49 is turned to open the switch 31 and disengage the cam 47 from the foot 53 of the lever 50. Lever 50 is then moved under bias of spring 56 to bring the end 50' thereof into engagement with the collar 55. Manual movement of the shield 18 to its operative position will rotate the shaft 15 to a point where the abutment 54 is engaged by the end 50' of lever 50 against bias of tension spring 26. The shield 18 is thereby locked in operative position and may be released by turning knob 49 to a point where switch 31 is closed and cam 47 engages the foot 53 of lever 50 whereby to move the inner end 50' out of engagement with the abutment 54 and permit bias of the spring 26 to automatically raise the shield 18 to its inoperative position.

The size of shield 18 is such as to adequately shield the operator's eyes from direct rays of the headlights of an approaching car but not to interfere with visibility on the right hand side of the road. The shaft 15 is of a length to permit lateral adjustment of the shield 18 to provide the greatest protection for the operator. In fact, by loosening the screw clamp 3, the entire device may be shifted longitudinally of the windshield 2 to the most advantageous position thereon.

From the foregoing, it will be clear that I have provided a simple and effective mechanism for accomplishing the objects set forth; and, while I have disclosed a preferred embodiment of my device, it will be understood that the same is capable of modification without departure from the spirit and scope of the invention as defined in the claims.

What I claim is:

1. In an automotive vehicle having high and low beam headlight circuits and a selector switch for selectively connecting said circuits to a source of electrical energy, an anti-glare apparatus comprising, a frame, a shaft journalled in said frame, a glare shield secured to said shaft and movable therewith into and out of operative position in the field of vision of the operator, a solenoid motor on said frame, said solenoid motor comprising fixed movable elements and being operatively connected to the low beam circuit whereby to be energized by the closing of said circuit, means for connecting the movable element of said solenoid motor to said shaft for imparting limited rotary movements thereto, spring means biasing said shield toward inoperative position, an abutment on said shaft, a lever pivoted in said frame and having a portion movable into and out of the path of travel of said abutment, a manually-operated cam element cooperatively associated with the lever to move the latter to a position out of the path of travel of the abutment and releasably retain the same in such position, and yielding means biasing said lever toward operative engagement with said cam element and said abutment.

2. The structure defined in claim 1 in further combination with switch means operatively associated with said cam element for disconnecting said solenoid motor from said low beam circuit when said cam element is in a position to allow the lever to be moved by said yielding means to a position in the path of travel of the abutment.

3. A supporting structure adapted to be mounted on an automotive vehicle adjacent the windshield thereof, a shaft journalled in said supporting structure, a glare shield secured to said shaft and movable therewith into and out of operative position, a solenoid coil on said supporting structure, a magnetically responsive plunger mounted for reciprocation in said solenoid coil, means connecting the plunger to said shaft for imparting limited rotary movement to the shaft responsive to axial reciprocatory motion of the plunger, a spring biasing the shield toward its inoperative position, an abutment on said shaft, a lever pivoted in said supporting structure and having a portion movable into and out of the path of travel of said abutment, a manually-operated cam element operatively associated with the lever to move the latter to a position out of the path of travel of the abutment and releasably retain the same in such position, and yielding means biasing said lever toward operative engagement with said abutment.

4. The structure defined in claim 3 in further combination with a switch controlling energization of the solenoid coil, and a common control means for the switch and said cam element moving the switch to a position to deenergize the solenoid coil when the cam is moved thereby to a position wherein the lever is in the path of travel of the abutment.

VICTOR S. SANG.

REFERENCES CITED

The following references are of record in the file of this patent:

UNITED STATES PATENTS

| Number | Name | Date |
| --- | --- | --- |
| 2,013,560 | Hacker | Sept. 3, 1935 |
| 2,134,414 | Norcross | Oct. 25, 1938 |
| 2,223,710 | Wiederhold | Dec. 3, 1940 |
| 2,237,579 | Ronning | Apr. 8, 1941 |